United States Patent [19]
Steinborn

[11] Patent Number: 5,775,018
[45] Date of Patent: Jul. 7, 1998

[54] DISPLAY EYEGLASS FRAME

[76] Inventor: Mark J. J. Steinborn, 4276 Gratiot Ave., Port Huron, Mich. 48060

[21] Appl. No.: 699,423

[22] Filed: Aug. 19, 1996

[51] Int. Cl.$^6$ ............................. G09F 3/20; G09F 3/16
[52] U.S. Cl. ............................. 40/651; 40/299; 40/666
[58] Field of Search ............................. 40/299, 642.02, 40/649, 651, 654.01, 658, 666

[56] References Cited

U.S. PATENT DOCUMENTS

| | | | |
|---|---|---|---|
| 614,197 | 11/1898 | Boone | 40/666 |
| 750,436 | 1/1904 | De Carli | 40/658 |
| 1,599,167 | 9/1926 | Doucet | 40/658 |
| 1,695,036 | 12/1928 | Thursby | 40/1 |
| 1,839,016 | 12/1931 | Dodd | 40/658 X |
| 3,738,034 | 6/1973 | Seaver | 40/665 |
| 4,044,485 | 8/1977 | Hopp | 40/651 X |
| 4,540,093 | 9/1985 | Merl et al. | 40/649 X |
| 5,387,012 | 2/1995 | Hibbs et al. | 40/665 X |
| 5,537,765 | 7/1996 | Liebman | 40/299 |

*Primary Examiner*—Brian K. Green
*Attorney, Agent, or Firm*—Christopher John Rudy

[57] ABSTRACT

Display eyeglass frame includes a frame member which is adaptable for placement on or is resident and integral with an upper front or a bow portion of an eyeglass frame or lens. The frame member is suitable for containing or itself contains display indicia. A method of displaying the indicia with the display eyeglass frame includes showing but especially wearing the display eyeglass frame with indicia. The display eyeglass frame and method are useful for advertising, disclosing, displaying, or promoting a message.

7 Claims, 1 Drawing Sheet

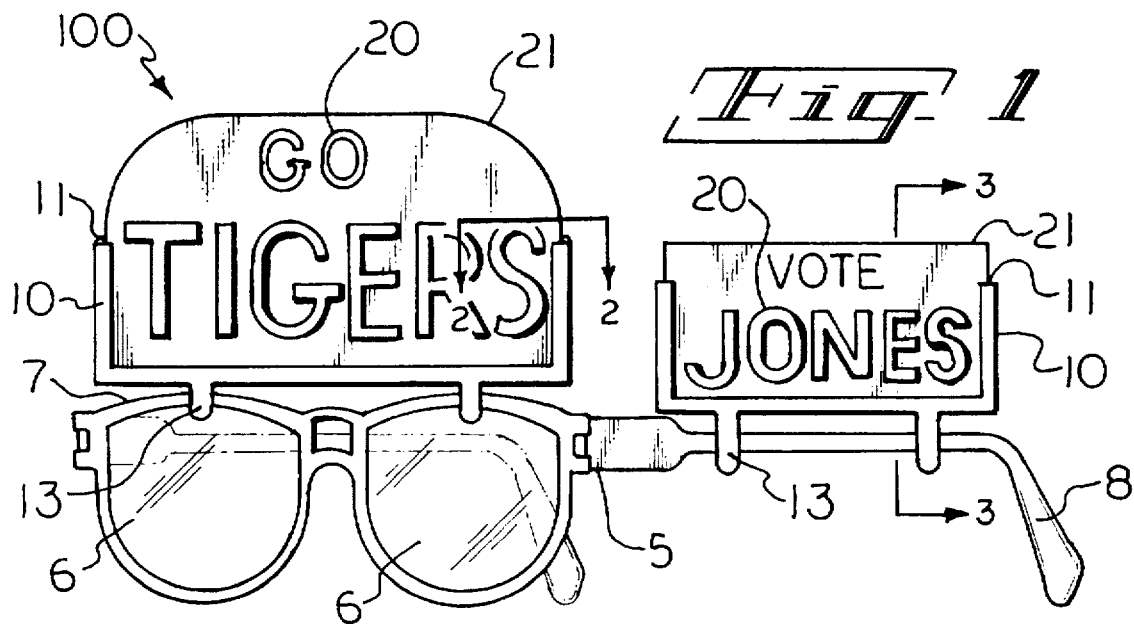
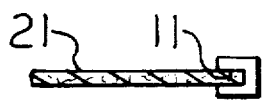
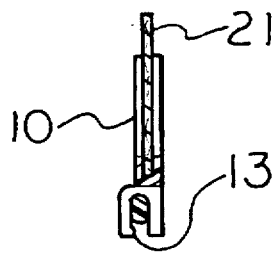
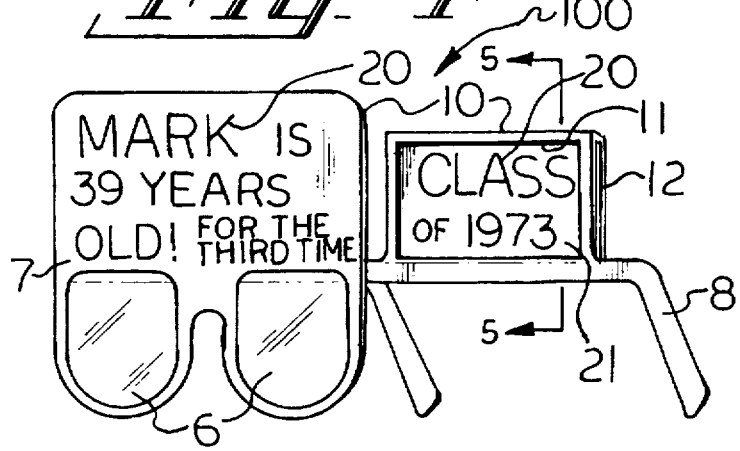
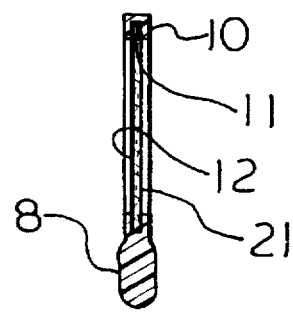

5,775,018

DISPLAY EYEGLASS FRAME

FIELD

This invention concerns a display device, useful as part of or in connection with eyeglasses and adaptable or suitable for advertising, disclosing, displaying, or promoting a message.

BACKGROUND

In the world of advertising specialties, various devices are known. One of the oldest is simply a cap such as a baseball cap, upon the front of which is displayed a team name or logo, product name or logo, and so forth. One add-on ad specialty device is a tag or sign which attaches to the back strap of an adjustable baseball cap by pushing the tag, which has a support member with a hole therein, onto the pin or button of the strap. Various messages may be placed thereon.

The ad specialty art is an old but fast-changing art, in which older products can be replaced by newer products that outdate or surpass the old in short order. Thus, the art is in constant need of new and innovative products.

In another world, that of trademark display, and in particular in the eyeglass sector, it is known that some prestige manufacturers have begun to place their logo on the lens itself.

SUMMARY

The present invention provides a display eyeglass frame comprising a frame member adaptable for placement on or resident and integral with an upper front or a bow portion of an eyeglass frame or lens, said frame member suitable for containing or containing itself display indicia. A method of displaying the indicia with the display eyeglass frame is included.

The invention is useful for advertising, disclosing, displaying, or promoting a message.

The invention supplies a long-felt need in the art. It can be used to display indicia to promote a favorite sports team, political candidate, new or preferred consumer products, to carry a humorous message such as those seen on bumper stickers, and so forth. Alternatively, the user could make up his own message identifying himself at a reunion, celebrating a special occasion, or with any idea he might wish to express. The display may include ideas not only expressed in writing but also those expressed pictorially or photographically. The invention is an especially powerful marketing tool because of the natural attraction of the face and eyes of the user.

Numerous further advantages attend the invention.

DRAWINGS

The drawings form part of the specification hereof. In the drawings, the following is briefly noted:

FIG. 1 is a front view of a display eyeglass frame of the invention.

FIG. 2 is a top view of part of the frame of FIG. 1, taken along 2—2.

FIG. 3 is a side, cut-away view of part of the frame of FIG. 1, taken along 3—3.

FIG. 4 is a front view of another embodiment of a display eyeglass frame of the invention.

FIG. 5 is a side, cut-away view of part of the frame of FIG. 4, taken along 5—5.

ILLUSTRATIVE DETAIL

The invention can be better understood by reference to the following detail, which may be taken in conjunction with the drawings. The same is not necessarily to be construed as limiting in nature.

With reference to FIGS. 1-5, display eyeglass frame 100 has frame member 10, which is suitable for containing or contains itself display indicia 20. The frame member may be suitable for containing the indicia such as provided by having the member made of a suitable material which can be written on by the user, say, with a marking pen, or as provided by having the member include means for holding separable indicia such as through rails 11 (FIGS. 2 & 5) and/or slots 12 (FIG. 5), or in the alternative, as through spring-loaded clips, magnetic devices, glue, and so forth. A separable indicia placard 21 (FIGS. 1 & 2 and 4 & 5), which may be of virtually any suitable shape, may be attached to provide for the display indicia. The placard may be made with a pre-printed message and/or include an area in which the user may write, draw or display his own message.

As depicted in FIGS. 1 & 3, frame member 10 can be adapted for placement on portions of a pair of eyeglasses 5 such as on the upper part of lens 6, eyeglass upper front portion 7, or bow portion 8. To this end, the frame member may include means for attaching such as clips 13, or in the alternative, pins to be inserted in corresponding holes in the eyeglasses, magnetic devices, glue, and so forth. As well, the indicia may be attached with clips similar to those used for flip-up sunglasses. An attachable frame member may itself include display indicia.

As depicted in FIGS. 4 & 5, the frame member 10 can be made integral with the upper front 7 or bow 8 of the eyeglass frame.

The display eyeglass frame can be made of any suitable material(s). Accordingly, material(s) such as plastic, metal, wood, or paper, and so forth, may be employed. Known methods may be employed.

By showing the display eyeglass frame, which includes wearing the same, a method of use of the invention is practiced. Thereby, the message of the display indicia may be recognized, and this, again, can be most powerful as the message is displayed about the face of the user.

CONCLUSION

The present invention is thus provided. Numerous adaptations can be effected within its spirit, the literal claim scope of which is particularly pointed out as follows:

I claim:

1. A display frame member in combination with a pair of eyeglasses that can be worn by a wearer comprising:

the pair of eyeglasses having two lenses assembled to a front lens frame including a nose bridge between the lenses and having a pair of opposing bows for resting above ears of the wearer of the eyeglasses, and the display frame member attached to the pair of eyeglasses, wherein the display frame member includes a set of rails which form channels, and a separate card having display indicia thereon held within the channels of the rails for removably securing the separate card to the display frame member.

2. The display frame member in combination with the pair of eyeglasses of claim 1, wherein the display frame member is directly attached to said front lens frame.

3. The display frame member in combination with the pair of eyeglasses of claim 1, wherein the display frame member is directly attached to at least one of the bows of said pair of opposing bows.

4. The display frame member in combination with the pair eyeglasses of claim 3, wherein a second display frame member is integral with said front lens frame.

5. The display frame member in combination with the pair of eyeglasses of claim 1, wherein the display frame member is attached by means of at least one clip.

6. A method of using a display eyeglass frame comprising steps of providing a display frame in combination with a pair of eyeglasses that can be worn by a wearer including the pair of eyeglasses having two lenses assembled to a front lens frame including a nose bridge between the lenses and having a pair of opposing bows for resting above ears of the wearer of the eyeglasses; attaching the display frame member to the pair of eyeglasses, wherein the display frame member includes a set of rails which form channels for removably securing thereto a separate card having display indicia thereon; and inserting said separate card into the channels of the rails, and securing said separate card to the display frame member.

7. The method of claim 6, further including the step of wearing the display eyeglass frame as a pair of glasses.

* * * * *